(12) United States Patent
Alimpich et al.

(10) Patent No.: US 8,151,206 B2
(45) Date of Patent: Apr. 3, 2012

(54) MODIFYING AN ORDER OF PROCESSING OF A TASK PERFORMED ON A PLURALITY OF OBJECTS

(75) Inventors: Claudia Alimpich, Boulder, CO (US); James M. Herold, Greeley, CO (US); Amy L. Varin, Berthoud, CO (US)

(73) Assignee: International Business Machines Corporation, Armonk, NY (US)

( * ) Notice: Subject to any disclaimer, the term of this patent is extended or adjusted under 35 U.S.C. 154(b) by 654 days.

(21) Appl. No.: 11/695,839

(22) Filed: Apr. 3, 2007

(65) Prior Publication Data

US 2008/0250348 A1 Oct. 9, 2008

(51) Int. Cl.
*G06F 3/048* (2006.01)
(52) U.S. Cl. .................... 715/772; 715/809
(58) Field of Classification Search ............ 715/809, 715/772
See application file for complete search history.

(56) References Cited

U.S. PATENT DOCUMENTS

| | | | |
|---|---|---|---|
| 5,953,010 A | 9/1999 | Kampe et al. | |
| 6,044,387 A | 3/2000 | Angiulo et al. | |
| 6,108,004 A * | 8/2000 | Medl | 715/804 |
| 6,285,366 B1 | 9/2001 | Ng et al. | |
| 6,639,687 B1 | 10/2003 | Neilsen | |
| 6,874,130 B1 * | 3/2005 | Baweja et al. | 715/805 |
| 6,901,558 B1 * | 5/2005 | Andreas et al. | 715/772 |
| 6,965,953 B2 * | 11/2005 | Kujirai | 710/62 |
| 7,171,626 B2 * | 1/2007 | Sheldon et al. | 715/810 |
| 7,616,235 B2 * | 11/2009 | Shibuya et al. | 348/231.2 |
| 2003/0065773 A1* | 4/2003 | Aiba et al. | 709/224 |
| 2004/0056903 A1* | 3/2004 | Sakai | 345/853 |
| 2006/0236253 A1* | 10/2006 | Gusmorino et al. | 715/762 |
| 2007/0136485 A1* | 6/2007 | Mitsui | 709/230 |
| 2007/0277126 A1* | 11/2007 | Park et al. | 715/866 |

* cited by examiner

*Primary Examiner* — Ashraf Zahr
(74) *Attorney, Agent, or Firm* — David W. Victor; Konrad Raynes and Victor LLP

(57) ABSTRACT

Methods, apparatuses and computer program products are provided for modifying an order of processing of a task performed on a plurality of objects. A user selects a plurality of objects and a task to perform on the objects, and the initial order of processing of the objects is displayed to the user. The user may modify the initial order of processing to generate a modified order of processing while the task is performed on one of the objects. For example, a user may remove an object not yet processed from the order of processing. Performance of the task then continues on the remaining objects in the modified order of processing.

19 Claims, 17 Drawing Sheets

| OPERATING SYSTEM | |
|---|---|
| ORDER | STATUS |
| • OBJECT 2 | TO CHANGE THE ORDER OF PROCESSING, DRAG ONE OR MORE OBJECTS UP OR DOWN IN THE ORDER. TO DELETE AN OBJECT, SELECT THE OBJECT AND PRESS THE DELETE KEY.<br><br>PRESS THE BEGIN BUTTON TO BEGIN THE PROCESS. |
| • OBJECT 3 | |
| • OBJECT 5 | |
| • OBJECT 6 | |
| | EXIT    BEGIN |

FIG. 6

| OPERATING SYSTEM | |
|---|---|
| ORDER | STATUS |
| • OBJECT 2 | PERFORMING TASK 2 ON OBJECT 2 |
| • OBJECT 3 | ▭▭▭▭▭▭▭▭▭▭▭▭▭▭▭▭▭▭▭▭▭▭▭▭ |
| | 65% COMPLETE |
| • OBJECT 5 | |
| | TO CHANGE THE ORDER OF PROCESSING, DRAG ONE OR MORE OBJECTS UP OR DOWN IN THE ORDER. TO DELETE AN OBJECT, SELECT THE OBJECT AND USE THE DELETE KEY. |
| • OBJECT 6 | |
| | ( EXIT ) |

MODIFYING AN ORDER OF PROCESSING OF A TASK PERFORMED ON A PLURALITY OF OBJECTS

BACKGROUND OF THE INVENTION

1. Field of the Invention

The invention relates to computing systems, and more specifically, to modifying an order of processing of a task performed on a plurality of objects.

2. Statement of the Problem

There are many different graphical user interfaces (GUIs) that allow a user to select one or more objects and then choose to perform a task on those objects. Typically, the GUI allows the user to select the objects and the task, and then performs the task on the objects without user intervention. Exemplary objects include files, fonts, libraries, resources, devices, etc. For example, a user may select multiple files within an operating system and then choose to copy or delete the selected files. The operating system then proceeds to complete the copying or deleting task without user intervention. In some cases, a GUI may display the progress of the task to the user, allowing the user to monitor the progress of the task on the multiple objects.

However, problems exist because a user cannot modify the order of processing of objects. The operating system or software application typically determines an initial order of processing of the objects, and the user cannot modify the order or remove objects from the initial order after performance of the task on the objects begins. For example, a user may select five objects, such as font files, to install on a printer. The installer application begins installing the fonts, and then the user decides they don't want to install one of the fonts on the printer. Presently, a user's only option is to cancel the entire installation process of all five files, and restart the installation by selecting the desired four fonts to be installed. Further, a user typically has no idea which object will be selected next, nor do they have any idea where they are in the process. Thus, after several minutes of installing, the user may not know which fonts have already been installed, and which fonts are still awaiting installation.

This causes further problems when a user selects multiple objects to perform a task on, because in some situations, the user may not be aware that the action cannot be performed simultaneously on all of the objects. This error condition may be handled in several different ways. If a software application or operating system cannot perform the task on the selected objects, then the software application may notify the user of the error condition by graying out or disabling the task button before the task begins. However, the user may not be aware of which object caused the error condition.

The software application may also present the user with an error message, but again, the user may not be aware of which object caused the error condition. In either case, the software application does not perform the requested task on any of the objects. In another situation, the software application may perform the task on only one of the objects, but the logic is typically random from the user's perspective onto which object the task is performed. In this case, the user may not be aware of which objects the operating system performed the task on, or which object caused processing of the task to cease.

SUMMARY OF THE SOLUTION

The invention solves the above and other problems by allowing a user to modify the order of processing of a task performed on a plurality of objects. A user may select a task performed on the objects, such as installing the objects, and change the order of processing of the objects and/or remove one or more objects from the initial order of processing. Embodiments of the invention may be implemented in a GUI of a software application, device or operating system to allow a user to view the order of processing for the objects and change the order after performance of the task has begun.

One embodiment of the invention is a method for modifying an order of processing of a task performed on a plurality of objects. The method comprises receiving user input selecting a task to be performed on the objects and displaying an initial order of processing of the objects. The method further comprises initiating performance of the task on the objects based on the initial order. The method further comprises receiving user input indicating a modification to the initial order, and modifying the initial order based on the user input to generate a modified order of processing. The method further comprises continuing performance of the task on the objects based on the modified order.

A second exemplary embodiment of the invention comprises an apparatus for modifying an order of processing of a task performed on a plurality of objects. The apparatus comprises an interface adapted to receive user input selecting a task to be performed on the objects. The apparatus further comprises a processing system adapted to display an initial order of processing of the objects and initiate performance of the task on the objects based on the initial order. The interface is further adapted to receive user input indicating a modification of the initial order. The processing system is further adapted to modify the initial order based on the user input to generate a modified order of processing, and further adapted to continue performance of the task on the objects in the modified order of processing.

For example, a task may comprise installing a plurality of objects, such as fonts, onto a printer. A user may select fonts to install through a GUI. The GUI may display an initial order of installation of the fonts in a status panel. A software application attached to the GUI may then begin installation of the fonts on the printer by displaying a wizard for the first font in the initial order in a separate panel of the GUI. A user may then desire to modify the initial order by dragging one of the fonts in the initial order displayed in the status panel. The GUI modifies the initial order to generate a modified order, and displays the modified order in the status panel. The GUI continues installing the fonts in the modified order, displaying a wizard for the fonts at the appropriate time in the wizard panel, and updating a status of a font in the status panel once installation of the font is complete.

The invention may include other exemplary embodiments described below.

DESCRIPTION OF THE DRAWINGS

The same reference number represents the same element or same type of element on all drawings.

FIG. 5 illustrates an exemplary GUI displaying an initial order of processing of objects in an exemplary embodiment of the invention.

FIG. 6 illustrates an exemplary GUI displayed to a user once installation of object 2 begins in an exemplary embodiment of the invention.

DETAILED DESCRIPTION OF THE INVENTION

FIGS. 1-18 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
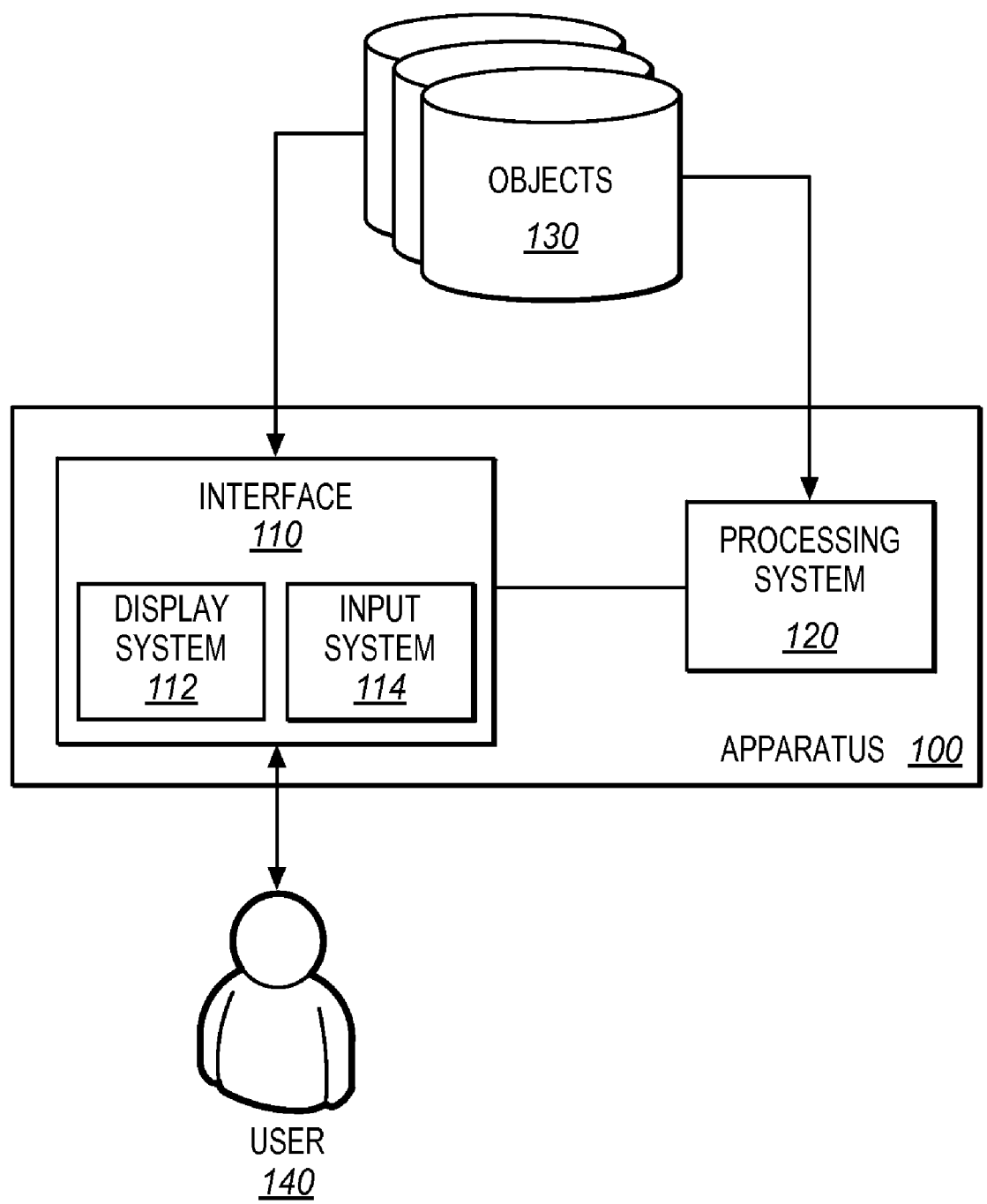
FIG. 1 illustrates an apparatus for modifying an order of processing of a task performed on a plurality of objects in an exemplary embodiment of the invention.

FIG. 1 illustrates an apparatus 100 for modifying an order of processing of a task performed on a plurality of objects 130 in an exemplary embodiment of the invention. Objects 130 maybe files, fonts, E-mails, libraries, external devices, documents, processes etc. on which a task may be performed. For example, a task may involve installing multiple libraries on a computer, or configuring multiple printers attached to a computer. Apparatus 100 may be any type of computing device, such as a personal computer, server, printer, etc.

Apparatus 100 includes an interface 110 for interfacing with a user 140. Interface 110 includes display system 112 for displaying information to user 140. Display system 112 may be a computer monitor or any suitable display device for displaying status information, dialog boxes, wizards, GUIs, etc. used to modify an order of processing of a task performed on a plurality of objects 130. Interface 110 further includes an input system 114 adapted to receive information from user 140. Input system 114 may be a keyboard, touch screen or any type of suitable system for receiving user input from user 140.

Apparatus 100 further includes a processing system 120 coupled to interface 110 for performing a task on objects 130, and for generating status information regarding the performance of the task. Processing system 120 refers to a single processing device or a group of inter-operational processing devices. The operation of processing system 120 may be controlled by instructions executable by processing system 120. Some examples of instructions are software, program code, and firmware.

Figure 2:
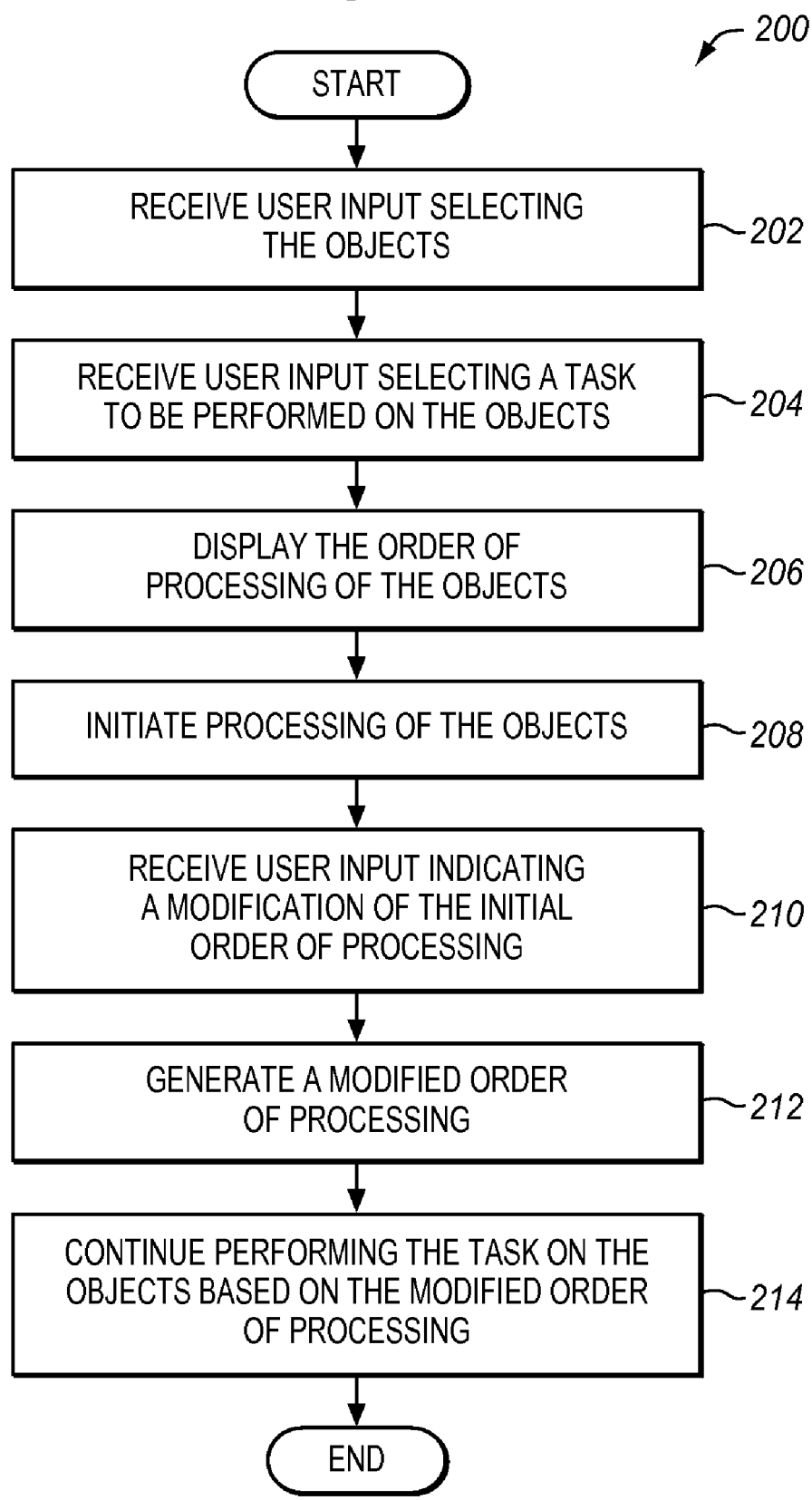
FIG. 2 illustrates a method for modifying an order of processing of a task performed on a plurality of objects in an exemplary embodiment of the invention.

FIG. 2 illustrates a method 200 for modifying an order of processing of a task performed on a plurality of objects 130 in an exemplary embodiment of the invention. The steps of method 200 will be described with reference to FIG. 1. Method 200 may not be all inclusive, and may include other steps not shown.

Figure 3:
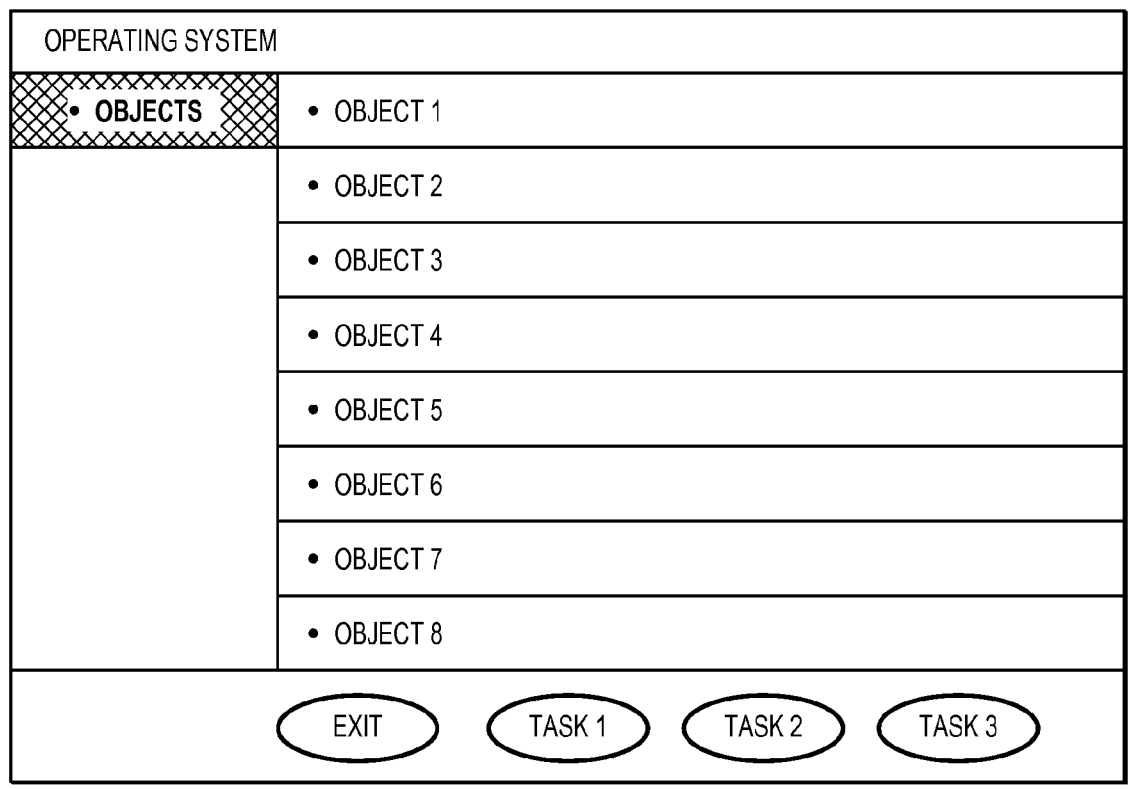
FIG. 3 illustrates an exemplary GUI that a user may use to select a plurality of objects in an exemplary embodiment of the invention.
Figure 4:
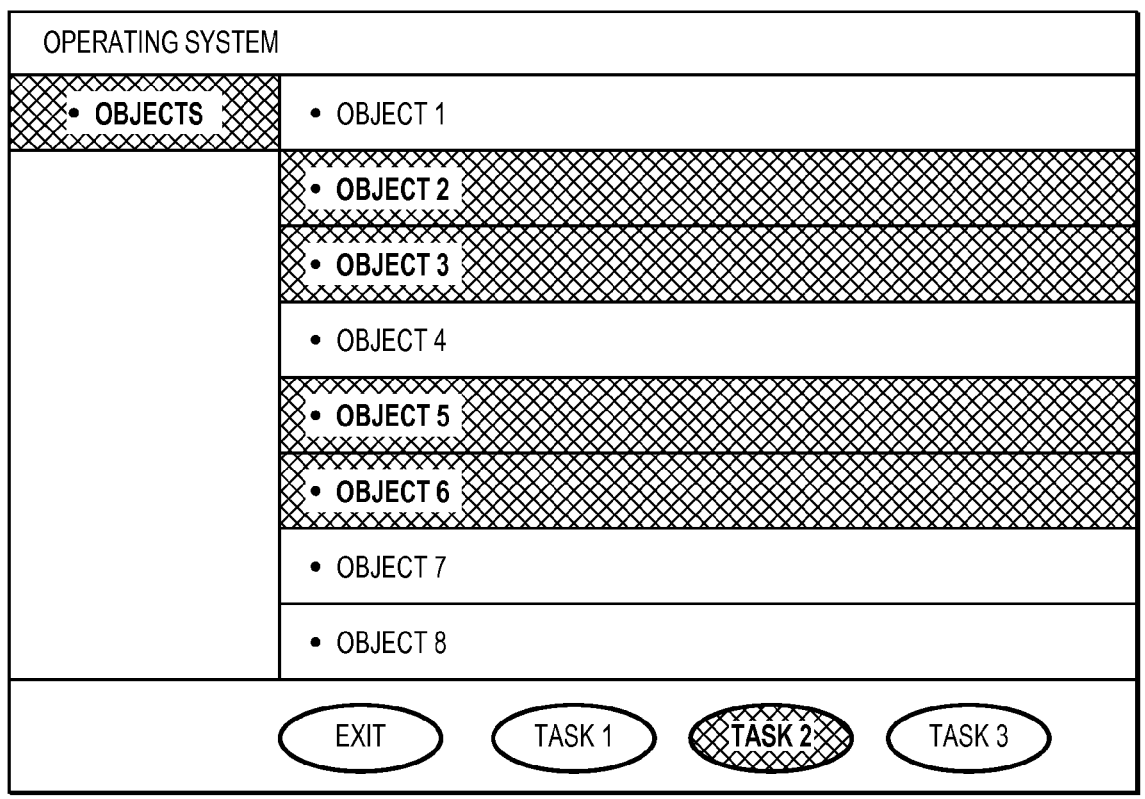
FIG. 4 illustrates an exemplary GUI where a user has selected multiple objects to perform a task on in an exemplary embodiment of the invention.

In step 202, input system 114 receives user input selecting a plurality of objects 130. FIG. 3 illustrates an exemplary GUI 300 that user 140 may use to select a plurality of objects 130 in an exemplary embodiment of the invention. GUI 300 may be displayed by display system 112. GUI 300 displays objects 1-8 and tasks 1-3. A user may select a plurality of objects 1-8. In step 204 of FIG. 2, input system 114 receives user input selecting a task to be performed on objects 130. For example, user 140 may select one of tasks 1-3 to perform on some of selected objects 1-8. FIG. 4 illustrates an exemplary GUI 400 where user 140 has selected multiple objects 130, represented by objects 2, 3, 5 and 6, and selects a task by pressing the task 2 button.

Processing system 120 may then determine an initial order of processing of the selected objects. Processing system 120 may determine the initial order using any type of priority ordering technique. For example, processing system 120 may determine the initial order based upon an original order of display of objects available for selection by user 140, an order of selection of objects 130 by user 140, a predetermined order by a software application or operating system performing the task, etc.

In step 206 of FIG. 2, processing system 120 displays the initial order to user 140 on display system 112. FIG. 5 illustrates an exemplary GUI 500 displaying the initial order in an exemplary embodiment of the invention. As illustrated in FIG. 5, processing system 120 determined the initial order based on the original display order of the objects. As such, absent any user modification, processing system 120 will perform the task on objects, 130 in the following order: object 2, object 3, object 5, object 6.

At this point, user 140 may modify the initial order, or may initiate performance of the task on objects 130. For example, to modify the initial order, user 140 may drag one or more objects up or down in the initial order displayed in GUI 500. Further, user 140 may delete an object by selecting the object and pressing the delete key. Those of ordinary skill in the art will readily recognize a variety of techniques for receiving user input indicating a modification of the initial order.

In step 208 of FIG. 2, processing system 120 initiates performance of the task on objects 130. Object 2 is illustrated first in the initial order, so performance of the task will begin on object 2. FIG. 6 illustrates an exemplary GUI 600 displayed to user 140 once processing of object 2 begins.

On the left side of GUI 600 is an order panel displaying the initial order of processing of objects 130. After processing system 120 performs the task on an object, the order panel may be updated to reflect completion of the task on the object. For example, processing system 120 may display a checkmark next to an object once the task is performed on the object. On the right side of GUI 600 is a status panel. The status panel displays information regarding the object which processing system 120 is presently performing the task on, such as dialog boxes guiding user 140 through the task, or a progress bar indicating a percentage of the task completed.

Figure 7:
FIG. 7 illustrates an exemplary GUI displaying a modified order of processing in an exemplary embodiment of the invention.

In step 210 of FIG. 2, processing system 120 receives user input modifying the initial order. For example user 140 may drag object 5 ahead of object 3 in the initial order. In step 212, processing system 120 modifies the initial order to generate a modified order of processing. FIG. 7 illustrates an exemplary GUI 700 displaying the modified order of processing in an exemplary embodiment of the invention.

In step 214 of FIG. 2, processing system 120 continues performing the task on objects 130 in the modified order. Thus, after processing system 120 performs the task on object 2, processing system 120 will perform the task on object 5, then on object 3 and finally on object 6. If user 140 desires to make additional modifications to the modified order, then steps 206 to 214 may be repeated to make the additional modifications, and the task would be performed on any remaining objects 130 based on the newly modified order of processing.

Figure 8:
FIG. 8 illustrates an exemplary GUI displaying a modified order of processing after object 5 has been removed in an exemplary embodiment of the invention.

Modifying the order of processing is not constrained to just moving processing of objects up or down. For example, user 140 may desire to delete an object from the order of processing once performance of the task begins on objects 130. For example, assume that user 140 views GUI 600 of FIG. 6. During processing of object 2, user 140 may decide to delete object 5 from the initial order. User 140 may select object 5 and press a delete key to remove object 5 from the initial order. Alternatively, object 5 may appear crossed out (e.g., a strikethrough) or with a circle/slash to the left of it to indicate that it has been deleted. FIG. 8 illustrates an exemplary GUI 800 displaying a modified order after object 5 has been removed in an exemplary embodiment of the invention. Thus, after processing of object 3 is complete, object 6 will be processed.

Figure 9:
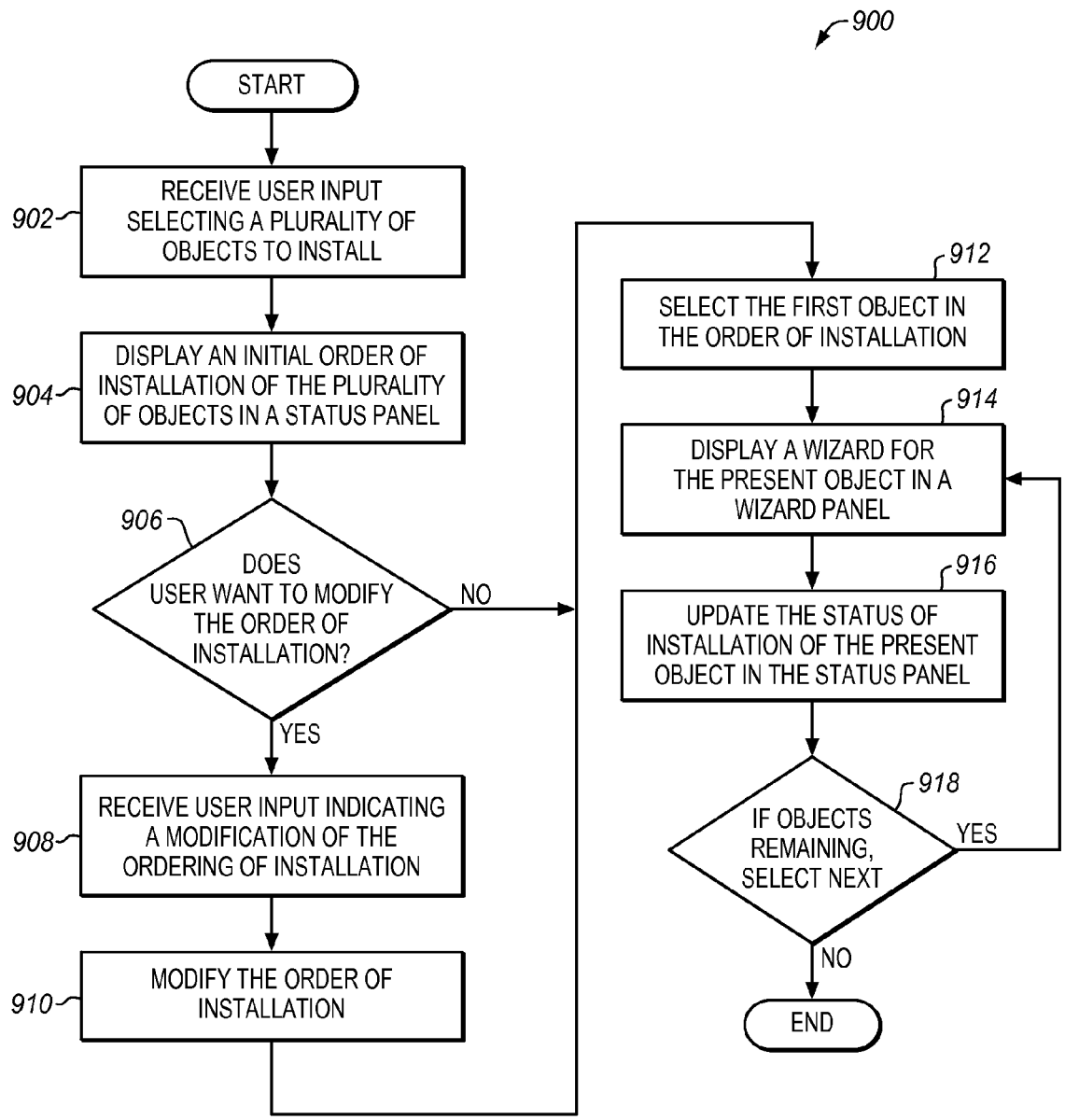
FIG. 9 illustrates another method for modifying an order of processing of an installation task performed on a plurality of objects in another exemplary embodiment of the invention.

FIG. 9 illustrates another method 900 for modifying an order of processing of an installation task performed on a plurality of objects 130 in another exemplary embodiment of the invention. The steps of method 900 will be described with reference to FIG. 1. Method 900 may not be all inclusive, and may include other steps not shown. In step 902, input system 114 receives user input selecting a plurality of objects 130 to install. Objects 130 may be installed on a computer system, external device, server or any suitable computing device. Objects may be software, drivers, fonts, resources, libraries, etc., on a computer or other type of device (e.g., a printer), which may be installed on a computer, operating system, software application or external device. Further, as used herein, "install" and "installation" refer to installing any type of object on a computing device. Installation may also refer to peripheral tasks associated with installation and set-up of a device, such as configuring software applications, drivers, computer hardware, external devices, etc. For example, install may refer to the installation of necessary printer drivers, fonts, resources or libraries for a printer, as well as the configuration of the installed printer.

Figure 10:
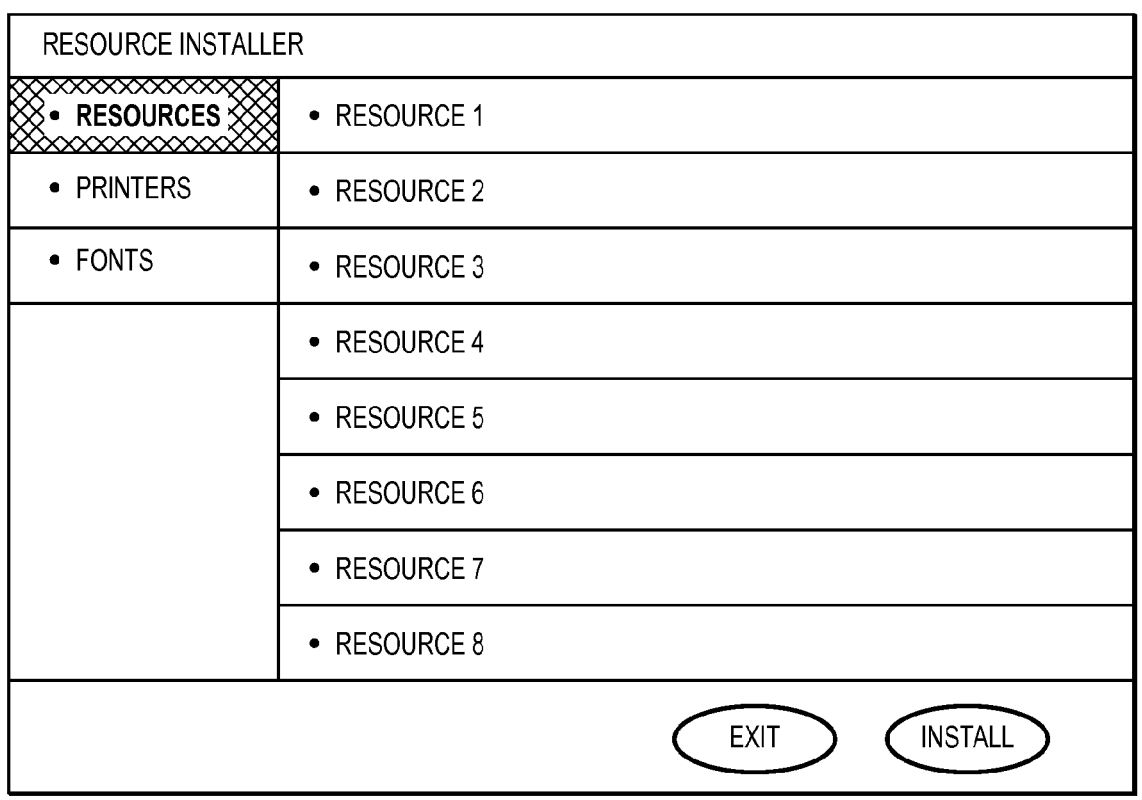
FIG. 10 illustrates an exemplary GUI that a user may use for selecting objects to install in an exemplary embodiment of the invention.
Figure 11:
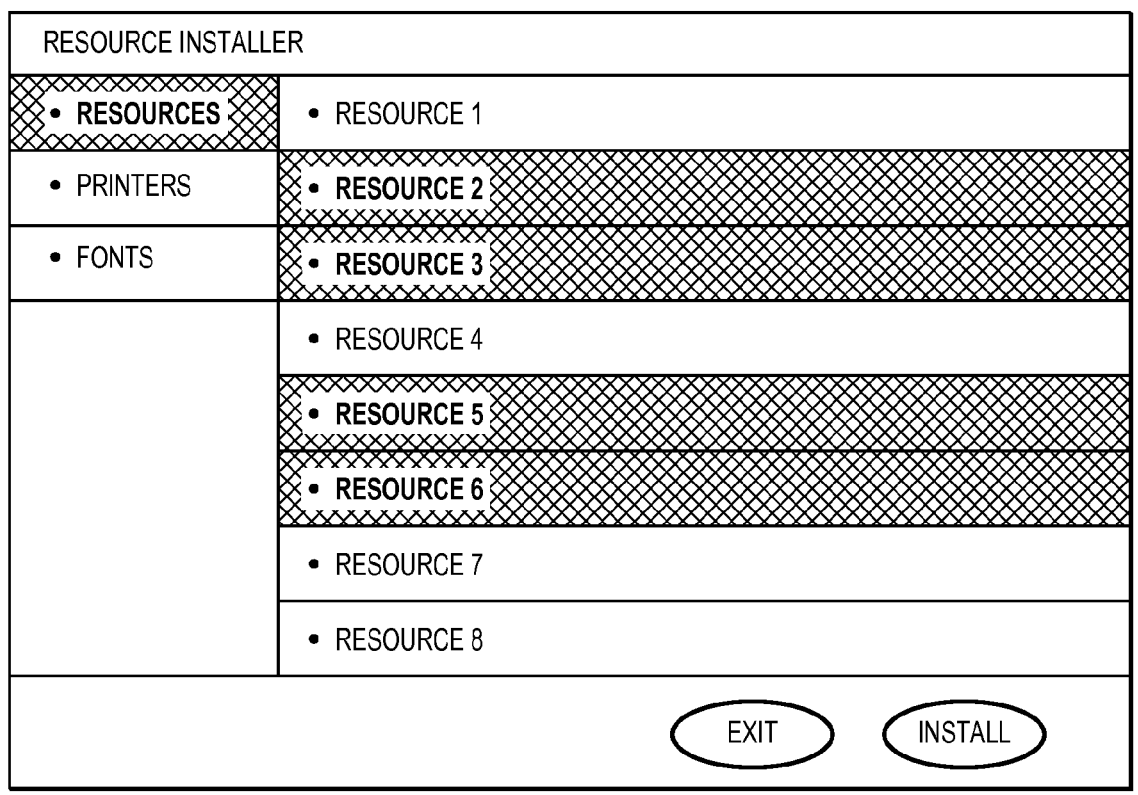
FIG. 11 illustrates an exemplary GUI where a user has selected multiple resources to install in an exemplary embodiment of the invention.

FIG. 10 illustrates an exemplary GUI 1000 that user 140 may use for selecting objects 130 to install in an exemplary embodiment of the invention. FIG. 11 illustrates an exemplary GUI 1100 where user 140 has selected multiple objects 130, represented by resources 2, 3, 5 and 6, to install, in an exemplary embodiment of the invention.

Figure 12:
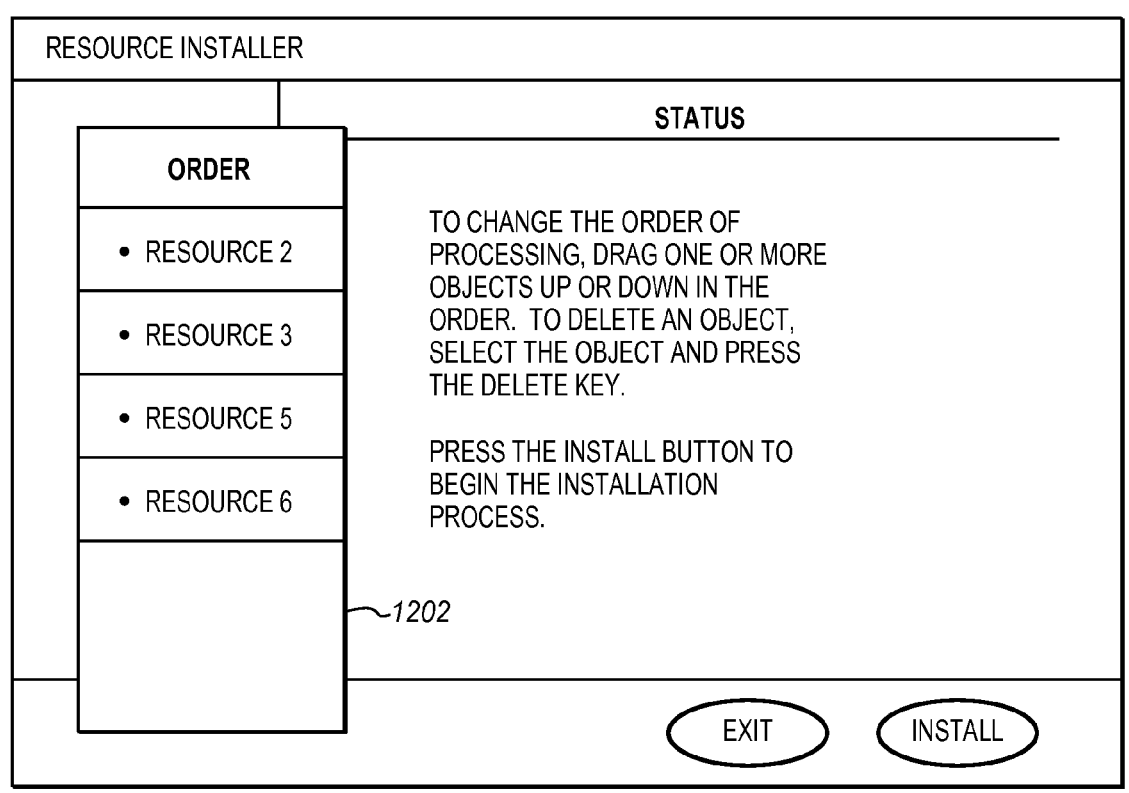
FIG. 12 illustrates an exemplary GUI displaying an initial order of installation of a plurality of resources in an exemplary embodiment of the invention.

In step 904 of FIG. 9, processing system 120 displays the initial order of processing of resources 2, 3, 5 and 6 in a status panel 1202 of FIG. 12. Absent user modification, objects 130 will be installed in the following order: resource 2, resource 3, resource 5 and resource 6.

At this point, user 140 may modify the initial order, or may initiate performance of the task on objects 130. In step 906, processing system 120 determines whether user 140 wants to modify the initial order. Processing system 120 may determine that user 140 wants to modify the initial order in response to user 140 selecting and/or dragging one of resources 2, 3, 5 and 6. Otherwise, processing continues in step 912 of FIG. 9.

Figure 13:
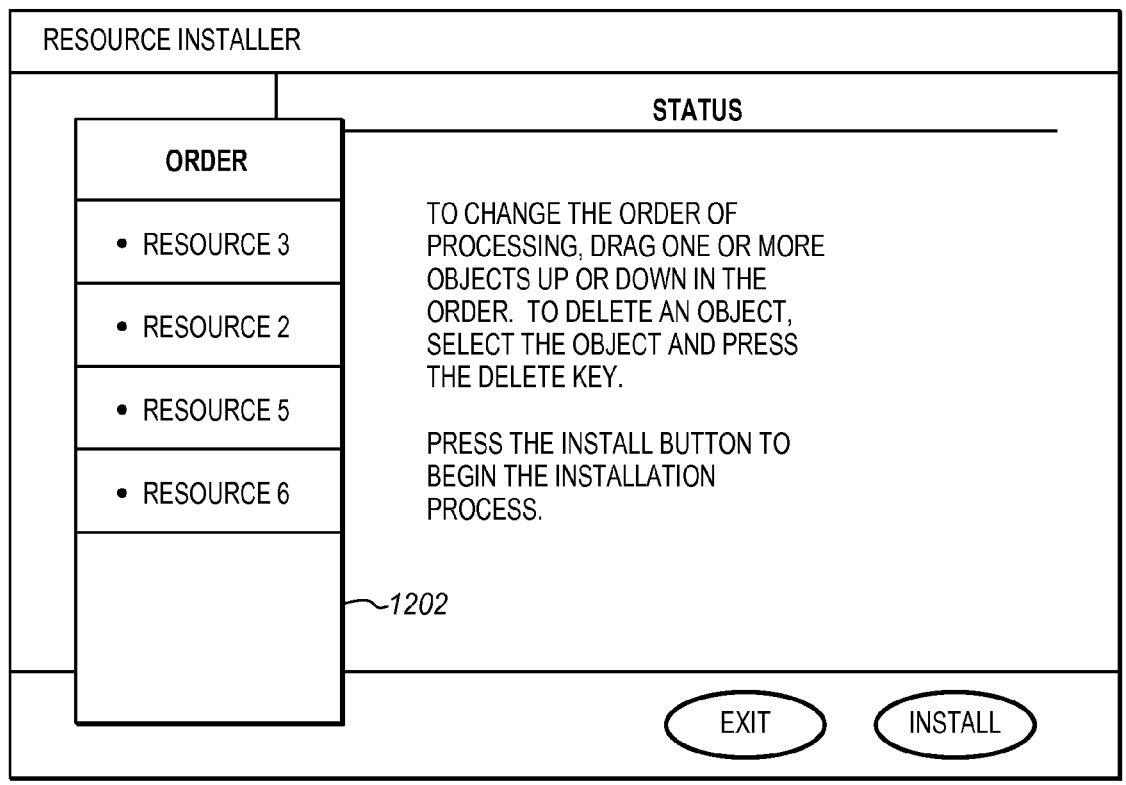
FIG. 13 illustrates an exemplary GUI displaying a modified order of installation in an exemplary embodiment of the invention.

In step 908 of FIG. 9, interface 110 receives user input indicating a modification to the initial order. For example, to modify the initial order, user 140 may drag one or more objects up or down in the initial order, such as dragging resource 3 ahead of resource 2. In step 910 of FIG. 9, processing system 120 modifies the order of processing in response to the user input received in step 908. FIG. 13 illustrates an exemplary GUI 1300 displaying the modified order determined in step 910.

Next, user 140 presses the install button to begin the installation process. Objects 130 maybe installed one at a time in the modified order. The modified order may be further changed during installation of any of the objects as described in method 200 of FIG. 2. In step 912 of FIG. 9, processing system 120 selects the first object in the order of processing (e.g., resource 3) to initiate installation of objects 130.

Figure 14:
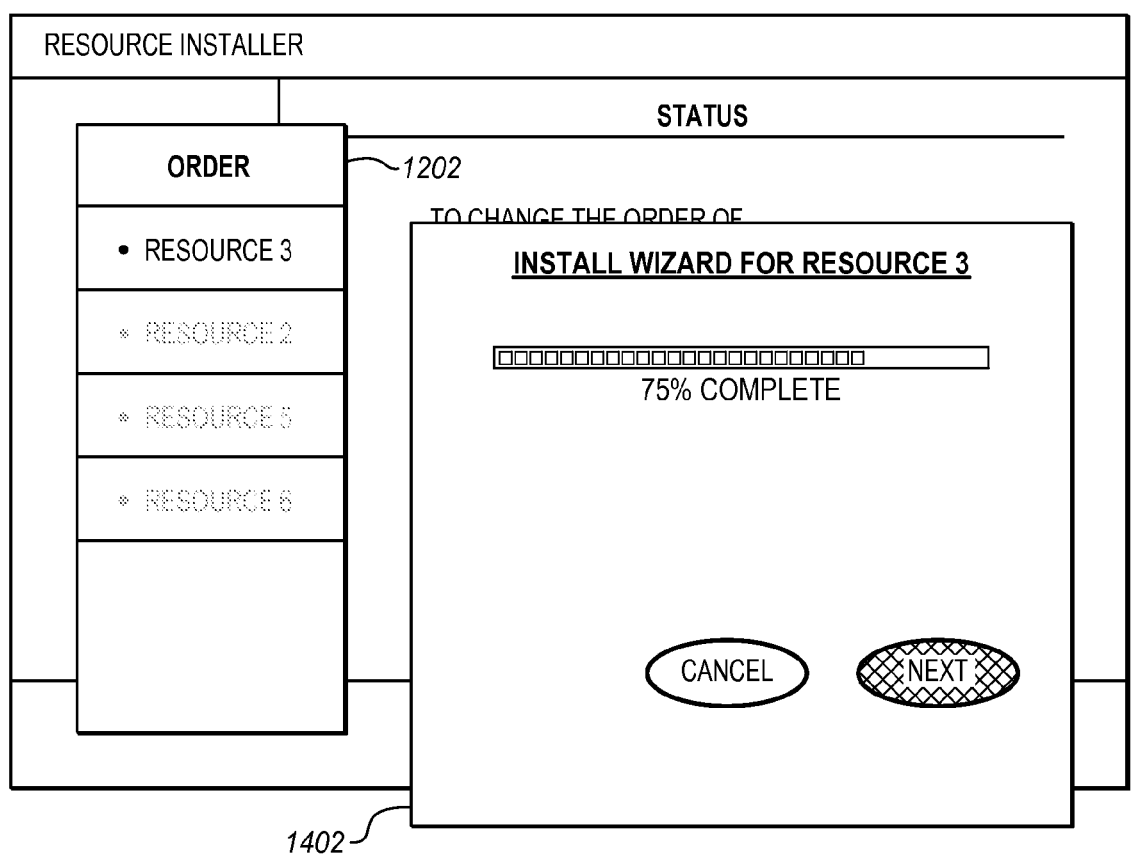
FIG. 14 illustrates an exemplary GUI displaying an installation wizard for a resource in an exemplary embodiment of the invention.

In step 914 of FIG. 9, processing system 120 displays a wizard for resource 3 in a wizard panel 1402 (see FIG. 14). A wizard is an interactive help utility that guides a user through a potentially complex task, such as configuring a printer driver to work with a new printer. Wizards may be implemented as a sequence of dialog boxes which a user can move forward and backward through, filling in the details required. Exemplary uses of a wizard in connection with method 900 include installing a software application, printer driver or other device driver, or configuring a printer, server, software application or other device. Alternatively, processing 120 may display a dialog box in place of a wizard for each resource.

In step 916 of FIG. 9, processing system 120 updates the status of resource 3 in status panel 1202. For example, processing system 120 may gray out the text of resources that have not been installed, and un-gray the text of a resource as it is installed or once it has been installed. Alternatively, processing system 120 may display a graphical icon next to resource 3 in status panel 1202 to indicate the current status of resource 3. Once installation of resource 3 is complete, processing system 120 may display an icon next to resource 3 to illustrate that resource 3 has been installed, such as a green checkmark. Likewise, a different icon may indicate that a resource has not yet been installed. In step 918 of FIG. 9, processing system 120 determines whether objects remain in the modified order. If objects remain in the modified order, then processing system 120 selects the next object, and loops back to step 914 of FIG. 9. Otherwise, installation of objects 130 is complete, and operation of method 900 concludes.

Figure 15:
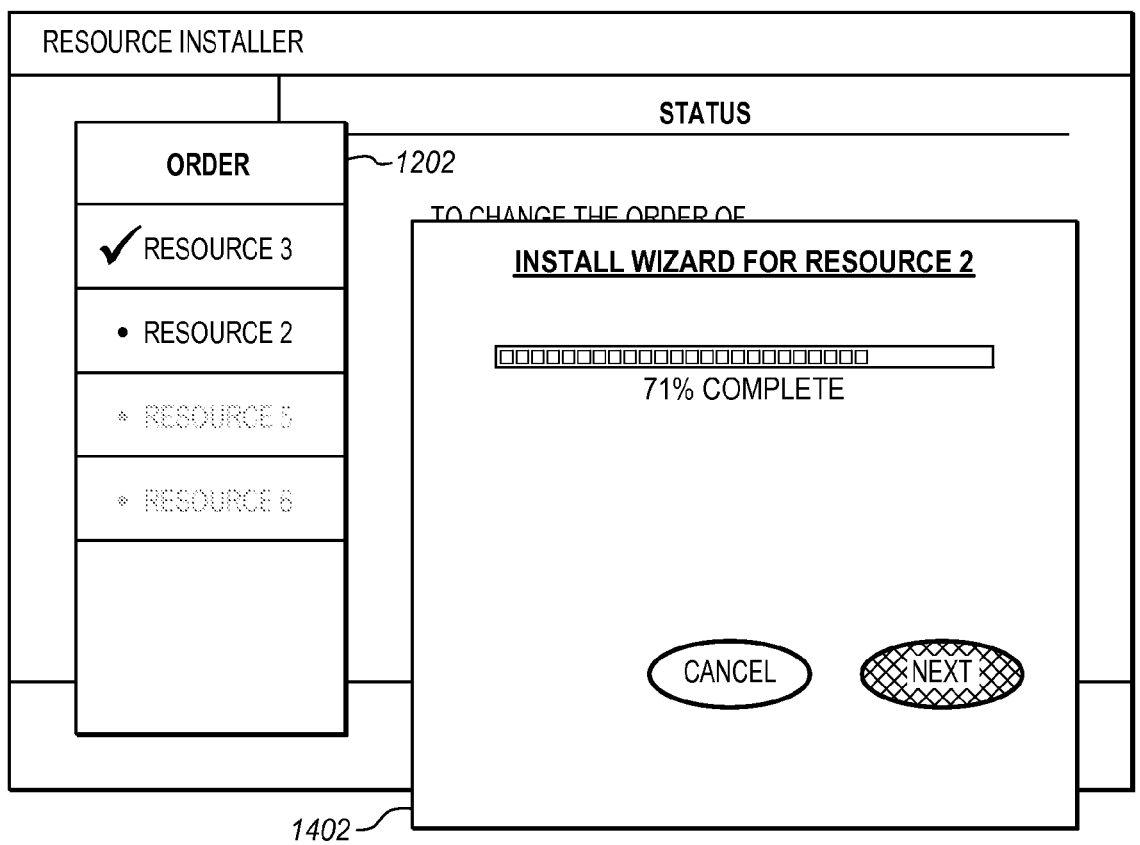
FIG. 15 illustrates an exemplary GUI displayed for a next object selected after installation of the object displayed in FIG. 14 is completed in an exemplary embodiment of the invention.

FIG. 15 illustrates an exemplary GUI 1500 displayed for a next object (e.g., resource 2) selected after installation of resource 3 is completed.

Wizards typically seek user input confirming that a task is completed prior to exiting. For example, a user may press a complete button once an installation process is complete to confirm that the process is finished and to close the wizard. When using a different wizard for installation of each object, it may be beneficial to display the wizard for a next object in the modified order after receiving user input confirming that the previous wizard has completed installation of the previous object in the modified order.

Figure 16:
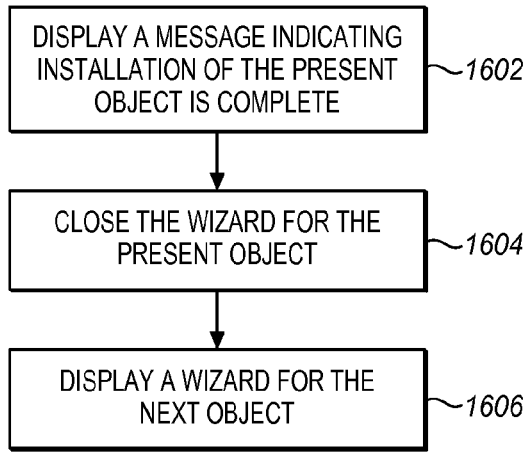
FIG. 16 illustrates additional details of step 914 of method 900 of FIG. 9.

FIG. 16 illustrates additional details of step 914 of method 900 of FIG. 9. Step 914 of method 900 is generally directed at displaying a wizard for a next object in the modified order.

Figure 17:
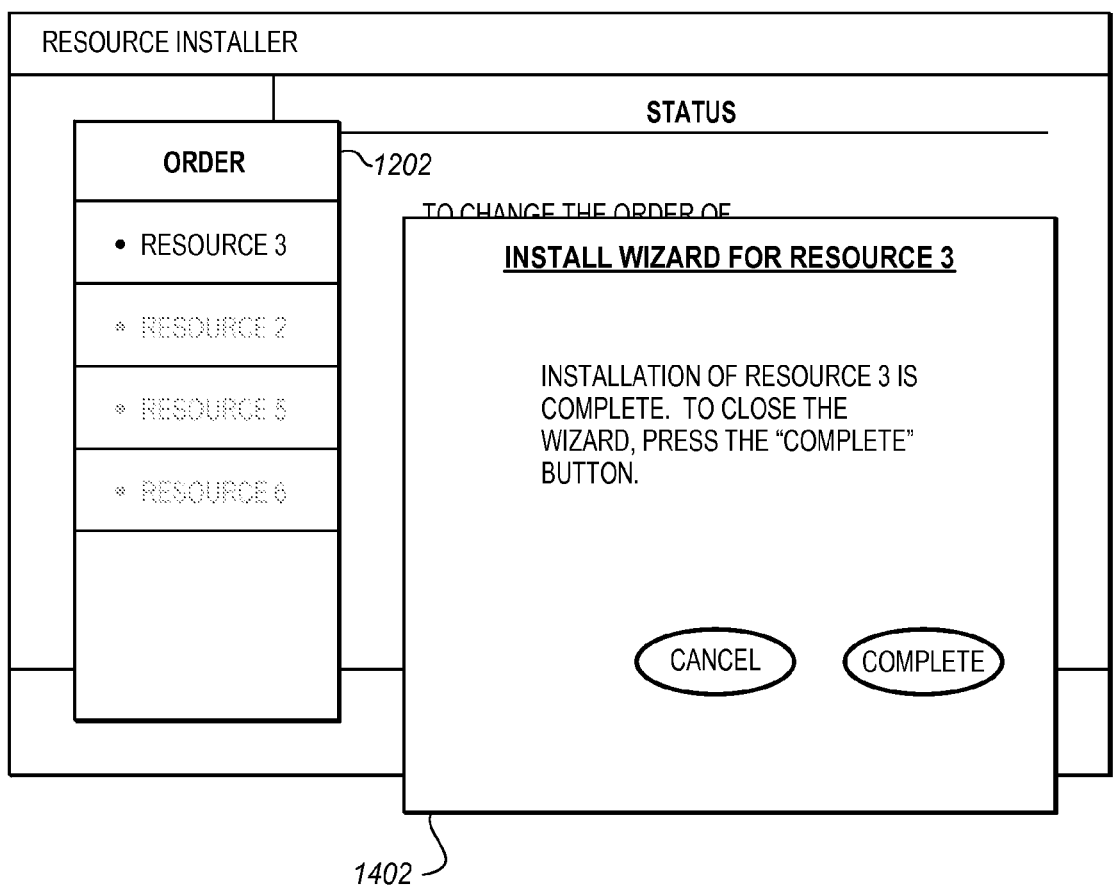
FIG. 17 illustrates an exemplary GUI displayed after an installation wizard completes installation of the present object in an exemplary embodiment of the invention.

In step 1602, processing system 120 displays a message indicating that the installation process of the present object is complete. Additionally, a complete button, which may have been previously grayed out and un-activated, may now be available for the user to confirm that the installation process of the present object is complete and to close the present wizard displayed in wizard panel 1402. FIG. 17 illustrates an exemplary GUI 1700 displayed after a wizard completes installation of the present object. In step 1604, processing system 120 closes the wizard for the present object (e.g., resource 3). In step 1606, processing system 120 displays a wizard for the next object (e.g., resource 2). Once all of objects 130 have been installed, a dialog box may be displayed indicating the success of the installation and allowing user 140 to exit the installation software.

Figure 18:
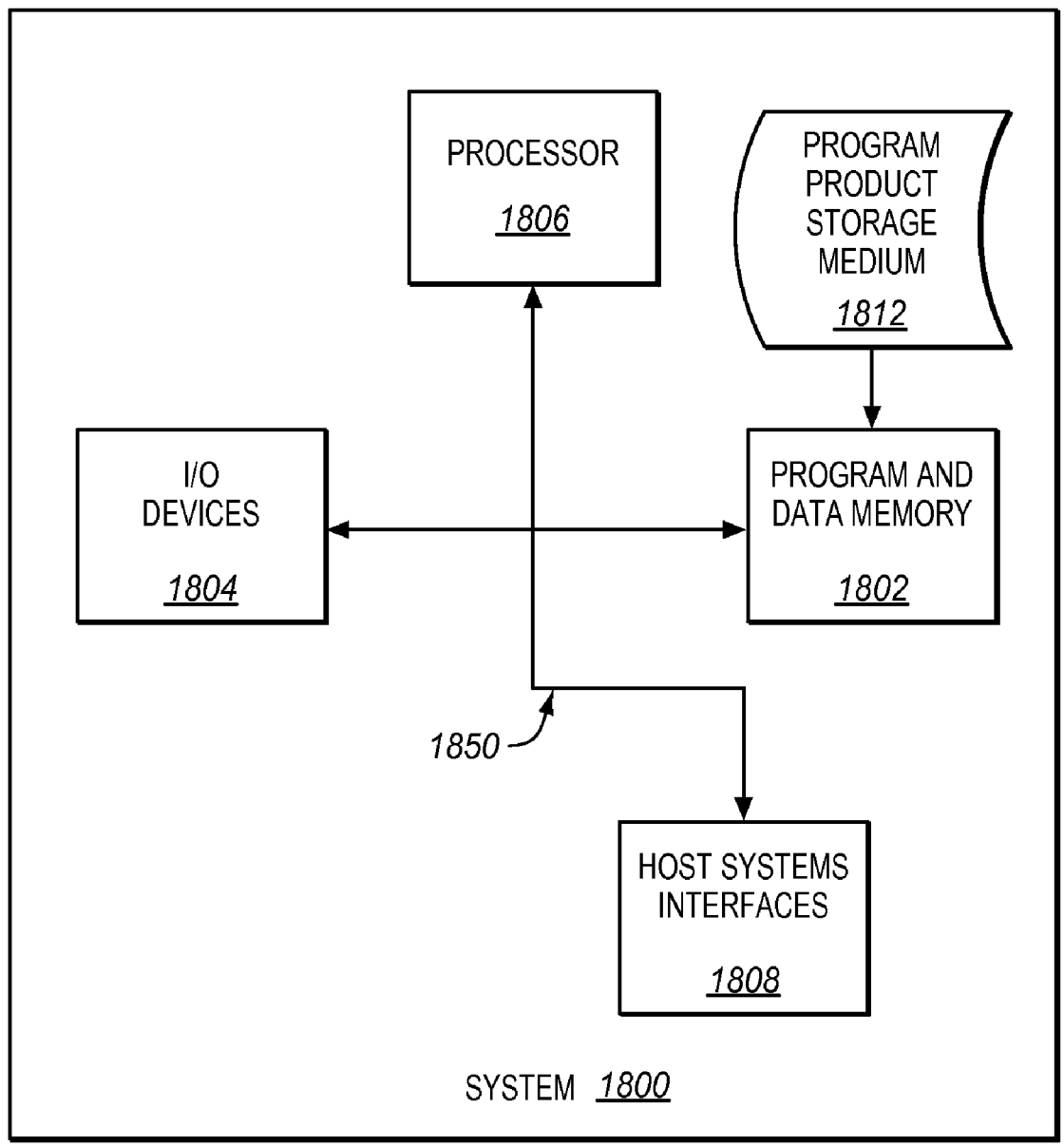
FIG. 18 is a block diagram of an exemplary data processing system that may provide for modifying an order of processing of a task performed on a plurality of objects in an exemplary embodiment of the invention.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc. FIG. 18 is a block diagram of an exemplary data processing system 1800 that may provide for modifying an order of processing of a task performed on a plurality of objects in an exemplary embodiment of the invention, including bulk storage of a program product that may embody methods and processes herein.

Furthermore, the invention can take the form of a computer program product accessible from a computer-usable or computer-readable medium 1812 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor 1806 coupled directly or indirectly to memory elements 1802 through a system bus 1850. The memory elements can include local memory employed during actual execution of the program code, bulk storage, and cache memories which provide temporary storage of at least some program code in order to reduce the number of times code must be retrieved from bulk storage during execution.

Input/output or I/O devices 1804 (including but not limited to keyboards, displays, pointing devices, etc.) can be coupled to the system either directly or through intervening I/O controllers. Network adapters or other host system interfaces 1808 may also be coupled to the system to enable the data processing system to become coupled to other data processing systems or storage devices through intervening private or public networks. Modems, cable modems, IBM Channel attachments, SCSI, Fibre Channel, and Ethernet cards are just a few of the currently available types of network or host interface adapters.

The apparatus, computer program product and methods described herein have been characterized in terms of installation tasks. However, those of ordinary skill in the art will recognize that the apparatus and methods described herein may be applicable to any type of task performed on a plurality of objects sequentially or concurrently.

Although specific embodiments were described herein, the scope of the invention is not limited to those specific embodiments. The scope of the invention is defined by the following claims and any equivalents thereof.

We claim:

1. A method for modifying an order of installing a plurality of objects on a computing device, the method comprising:
    receiving user input selecting an installation task to install the objects on the computing device;
    displaying an initial order of installing the objects;
    initiating installing the objects on the computing device based on the initial order;
    receiving user input indicating a modification to the initial order while installing the objects according to the initial order;
    modifying the initial order based on the user input to generate a modified order in which to install the displayed objects during the installation of the objects according to the initial order; and
    continuing installation of the objects from the object currently being installed based on the modified order, wherein during the installation of one of the displayed objects, performing:
        receiving user input through a wizard for a previous object indicating completion of installation of the previous object,
        displaying a wizard for the object being installed in a wizard panel in response to the user input indicating completion of installation of the previous object in the modified order; and
        updating a status of installation of the object in the status panel.

2. The method of claim 1, wherein modifying the initial order further comprises:
    removing at least one of the objects from the initial order.

3. The method of claim 1, wherein continuing installation of the objects further comprises:
    displaying the modified order in a first panel; and
    displaying dialog boxes for the objects in a second panel.

4. The method of claim 1, wherein continuing installation of the objects further comprises:
    displaying the modified order in a first panel; and
    displaying a wizard for the objects in a second panel.

5. The method of claim 1, wherein installing the objects includes configuring the computing device to operate with the installed objects.

6. The method of claim 1, wherein the computing device comprises a printer and wherein installing the objects includes installing printer drivers, fonts, and resources for the printer.

7. A computer program product comprising a computer useable medium storing a computer readable program for modifying an order of installing a plurality of objects on a computing device, wherein the computer readable program is executed by a processor to performs operations to:
receive user input selecting an installation task to install the objects on the computing device, wherein the task performs a same type of operation on each of the objects;
display an initial order of installing the objects;
initiate installing the objects on the computing device based on the initial order;
receive user input indicating a modification to the initial order while installing the objects according to the initial order;
modify the initial order of the objects based on the user input to generate a modified order in which to install the displayed objects during the installation of the objects according to the initial order; and
continue installation of the objects from the object currently being installed based on the modified order, wherein during the installation of one of the displayed objects, performing:
receiving user input through a wizard for a previous object indicating completion of installation of the previous object,
displaying a wizard for the object being installed in a wizard panel in response to the user input indicating completion of installation of the previous object in the modified order; and
updating a status of installation of the object in the status panel.

8. The computer program product of claim 7, wherein the computer readable program is further executed to:
remove at least one of the objects from the initial order.

9. The computer program product of claim 7, wherein the computer readable program is further executed to:
display the modified order of the objects in a first panel; and
display dialog boxes for the objects in a second panel.

10. The computer program product of claim 7, wherein the computer readable program is further executed to:
display the modified order of the objects in a first panel; and
display a wizard for the objects in a second panel.

11. The computer program product of claim 7, wherein installing the objects includes configuring the computing device to operate with the installed objects.

12. The computer program product of claim 7, wherein the computing device comprises a printer and wherein installing the objects includes installing printer drivers, fonts, and resources for the printer.

13. An apparatus for modifying an order of installing a plurality of objects on a computing device, the apparatus comprising:
an interface adapted to:
receive user input selecting an installation task to install the objects on the computing device;
a processing system coupled to the interface and adapted to:
display an initial order of installing the objects; and
initiate installing the objects on the computing device based on the initial order, and
wherein the interface is further adapted to receive user input indicating a modification of the initial order while installing the objects according to the initial order, and
wherein the processing system is further adapted to modify the initial order of processing based on the user input to generate a modified order in which to install the displayed objects during the installation of the objects according to the initial order, and further adapted to continue installation of the objects from the object currently being installed based on the modified order, wherein during the installation of one of the displayed objects, performing:
receiving user input through a wizard for a previous object indicating completion of installation of the previous object,
displaying a wizard for the object being installed in a wizard panel in response to the user input indicating completion of installation of the previous object in the modified order; and
updating a status of installation of the object in the status panel.

14. The apparatus of claim 13, wherein the processing system is further adapted to remove at least one of the objects from the initial order of processing.

15. The apparatus of claim 13, wherein the processing system is further adapted to:
display the modified order of the objects in a first panel; and
display dialog boxes for the objects in a second panel.

16. The apparatus of claim 13, wherein the processing system is further adapted to:
display the modified order of the objects in a first panel; and
display a wizard for the objects in a second panel.

17. The apparatus of claim 13, wherein installing the objects includes configuring the computing device to operate with the installed objects.

18. The apparatus of claim 13, wherein the computing device comprises a printer and wherein installing the objects includes installing printer drivers, fonts, and resources for the printer.

19. A method for modifying an order of processing of a task performed on a plurality of objects, the method comprising:
receiving user selection of a selected task comprising one of a plurality of displayed tasks, wherein each of the plurality of tasks provides a different set of operations to perform on the objects;
displaying an initial order of processing of the objects;
initiating performance of the task on the objects based on the initial order;
receiving user input indicating a modification to the initial order while performing the task on the objects according to the initial order;
modifying the initial order based on the user input to generate a modified order of processing while the task is being performed on the objects according to the initial order; and
continuing performance of the task on the objects based on the modified order, wherein during the installation of one of the displayed objects, performing:
receiving user input through a wizard for a previous object indicating completion of installation of the previous object,
displaying a wizard for the object being installed in a wizard panel in response to the user input indicating completion of installation of the previous object in the modified order; and
updating a status of installation of the object in the status panel.

* * * * *